May 30, 1944. C. F. CRUMB 2,349,847
BALER
Filed March 13, 1943
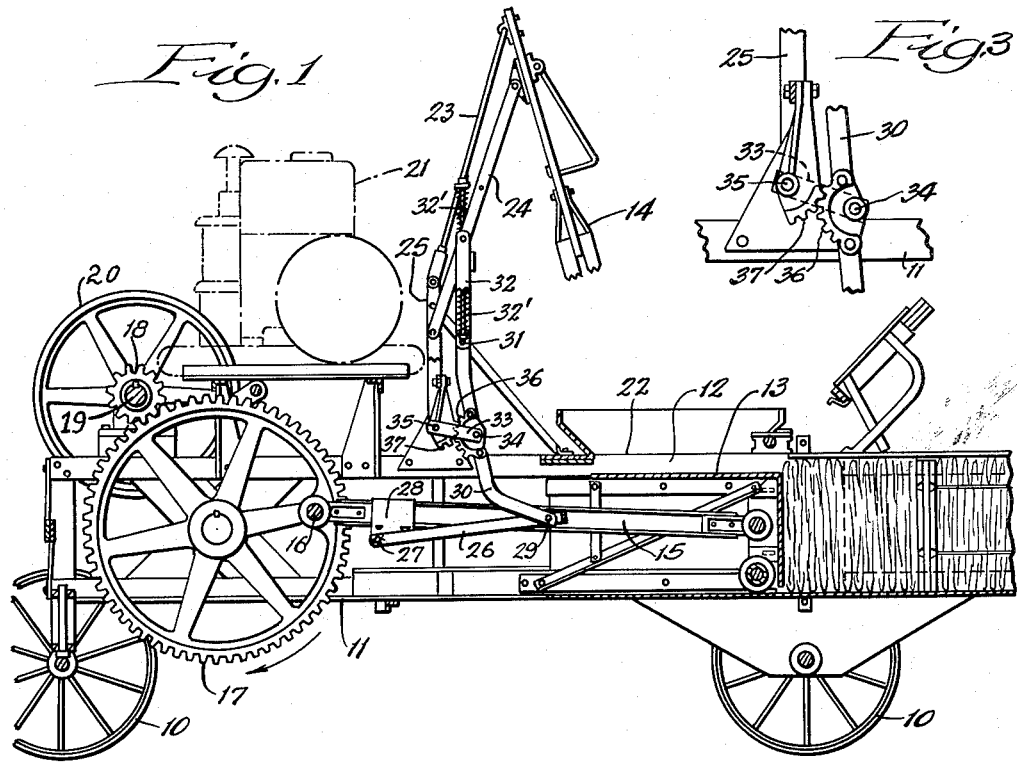
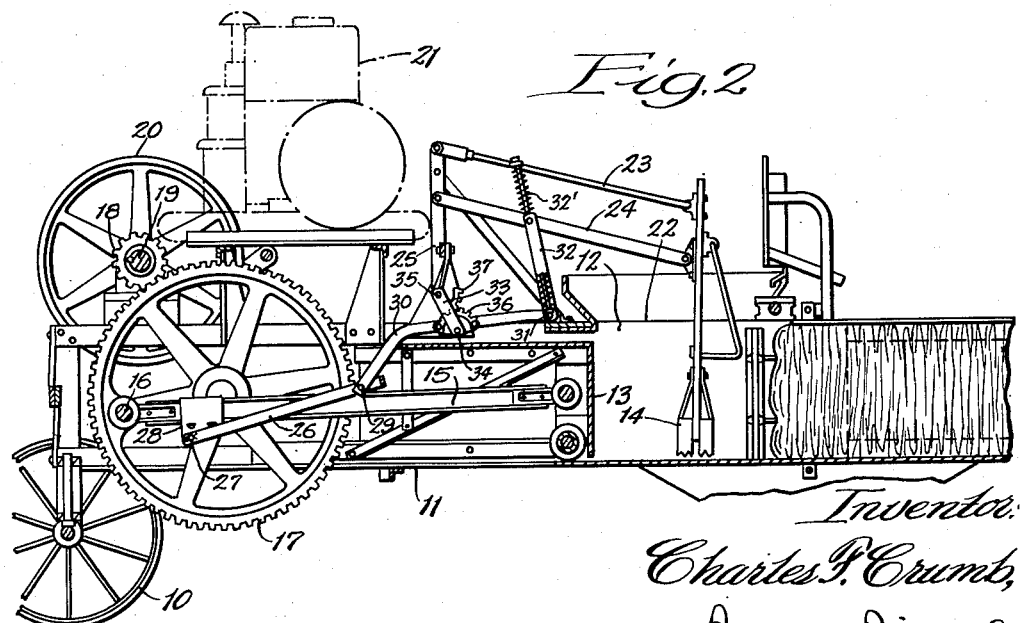

Patented May 30, 1944

2,349,847

UNITED STATES PATENT OFFICE 2,349,847

BALER

Charles F. Crumb, Clarendon Hills, Ill., assignor to International Harvester Company, a corporation of New Jersey Application March 13, 1943, Serial No. 479,051

12 Claims. (Cl. 100—25)

This invention relates to a baling apparatus. More specifically it relates to improvement in means for feeding material into a baling chamber.

Baling apparatuses are known which comprise a baling chamber, a plunger mounted for reciprocation therein, and a feeder movable into and out of the baling chamber through an opening in a side thereof. The feeder is connected with the means which drive the plunger in such a way that the feeder is out of the baling chamber when the baling plunger passes over the portion of the baling chamber into which the feeder is projected. It is important, of course, to keep the feeder out of the way of the plunger, and it is advantageous to keep the feeder in a position withdrawn from the baling chamber during as great a part as possible of the cycle comprising a reciprocation of the baling plunger. The present application has to do with connections between the feeder and the baling plunger which keep the feeder withdrawn from the baling chamber during a very substantial portion of the cycle.

An object of the present invention is to provide an improved baling apparatus.

A further object is the provision of an improved feeder for the baling apparatus.

Another object is to provide an improvement in the connections between a feeder for a baling chamber and the reciprocating plunger therein, by which the feeder is moved into and out of the baling chamber in timed relation with the reciprocations of the baling plunger.

Other objects will appear from the disclosure.

According to the present invention, the means which connect a baling plunger of a baler with a feeder thereof, whereby the feeder moves into and out of the baling chamber in timed relation with reciprocation of the plunger, include an arm pivoted on a fixed support and a member pivotally connected to the arm. Meshing gear segments are associated with the arm and the member so that pivotal movement of the arm about the support in a certain direction brings about a pivotal movement of the member with respect to the arm in the same direction. Thus, the feeder is moved very rapidly both into and out of the baling chamber.

In the drawing:

Figure 1 is a vertical section through a baler employing the improvement of the present invention, the feeder being withdrawn from the baling chamber and the plunger being in a forward position;

Figure 2 is a vertical sectional view similar to Figure 1, showing the baling plunger in retracted position and the feeder extending into the baling chamber; and Figure 3 is a detail view of parts constituting the improvement of the present application.

Figures 1 and 2 show a baling apparatus which includes supporting wheels 10, a supporting framework 11, a baling chamber 12, a baling plunger 13 mounted for reciprocation in the baling chamber, and a feeder 14. Connected to the baling plunger 13 is a pitman 15, which is in turn connected to a crank pin 16 mounted upon a bull-gear 17 rotatably mounted on the frame 11. The bull-gear 17 meshes with a pinion 18 secured upon a shaft 19 to which is also secured a belt pulley 20. The belt pulley 20 is driven from a belt, not shown, by an engine 21, the pulley 20 acting through the pinion 18 and the bull-gear 17, and the pitman 15 causes the baling plunger 13 to reciprocate in the baling chamber 12. In the top side of the baling chamber 12 is an opening 22 through which the feeder 14 is projected for feeding material into the baling chamber 12 from such means as a cross-conveyor, not shown, extending to the baling chamber. The feeder 14 is supported by approximately parallel links 23 and 24 connected to an upright member 25 secured to the top of the framework 11.

A link 26 is pivotally connected at 27 to a piece 28 secured to the pitman 15 near the crank pin 16. Pivotally connected to the other end of the link 26 at 29 is one end of a bent member 30. The other end of the bent member 30 is pivotally connected at 31 to a link 32 connected in turn by a resilient cushioning spring means 32' to the one parallel link 24. An arm or short member 33 is pivotally connected at 34 to an intermediate point of the bent member 30 and is pivotally mounted on a bolt 35 secured to the upright 25. Secured to the bent member 30 is a gear segment 36 having its center on the pivot 34 between the members 30 and 33. A gear segment 37 meshes with the gear segment 36 and is secured to the upright 25 with its center on the bolt 35 constituting the pivot of the member 33 on the upright 25.

The action of the meshing gear segments 36 and 37 is such that when the short member 33 pivots with respect to the upright 25 in a certain direction, the bent member 30 pivots in the same direction with respect to the short member 33. This happens because any movement of the gear segment 36 about and in meshing relation with the gear segment 37 must be one of rolling. Since the bent member 30 is secured to the gear segment 36, the bent member 30 must also roll. The aforesaid related movements of the members 30 and 33 with respect to one another and the fixed upright 25 brings about a rapid raising and lowering of the feeder 14. When, as in Figure 1, the feeder 14 is up and the baling plunger 13 is forward in the baling chamber 12, retraction of the baling plunger 13 to the left causes the lower end of the bent member 30 to be moved to the left. This necessarily results in a pivotal movement of the bent member 30 with respect to the short member 33 in a clockwise direction, and the short member 33 also moves in a clockwise direction about the bolt 35. Thus, the point 34, constituting the pivot of the bent member 30 on the short member 33, moves down. A rapid downward movement of the feeder 14 is brought about by the clockwise pivoting of the member 30 with respect to the member 33 and of the member 33 with respect to the fixed upright 25. Thus, the feeder 14 is brought quickly to the position in Figure 2 in which it extends into the baling chamber 12, pressing down material fed by it into the chamber. When the baling plunger 13 moves from the retracted position of Figure 2 to the forward position, the pitman 15, acting through the link 26, causes a movement to the right of the lower end of the bent member 30. This brings about a counterclockwise pivoting of the bent member 30 about the short member 33, and the rolling action of the meshing gear segments 36 and 37 cause a similar counterclockwise pivoting of the short member 33 with respect to the fixed upright 25. Thus, a very rapid raising of the feeder 14 is caused. Because of the aforesaid arrangement of parts, the parts may be so proportioned that during a fair amount of angular movement of the crank pin 16 on both sides of the forward dead-center positions, there is practically no vertical movement of the feeder 14. Thus, during a substantial portion of the cycle, in which the baling plunger 13 remains near its forwardmost position, there is practically no vertical movement of the feeder 14. As a matter of fact, any small amount of movement of the baling plunger 13 from the forwardmost position shown in Figure 1 would merely cause the upper end of the bent member 30, as indicated by the pivot point 31, to move practically on a horizontal line. Consequently, in this position any movement of the feeder amounts to only a fluttering or small up and down vibrational movement, since the pivot point 31 goes to a dead-center position, then beyond it, and then back to it.

It will be apparent from the foregoing description that there has been provided a new and novel means for interconnecting a baling plunger and a feeder of a baling apparatus. The means is such that the reciprocation of the baling plunger produces a very rapid vertical movement of the feeder. Accordingly, the amount of the reciprocation cycle required for movement of the feeder and the baling chamber and movement thereof out of the baling chamber is small, and the feeder may stay in its uppermost position away from the baling chamber during a substantial portion of the cycle in which the baling plunger is forward in the baling chamber. The intention is to limit the invention only within the scope of the appended claims.

What is claimed is:

1. In a baling apparatus comprising a support, means forming a baling chamber having an opening in one side, means mounting the aforesaid means on the support, a baling plunger mounted for reciprocation in the baling chamber, a feeding device movable into and out of the baling chamber through the opening, means mounting the feeding device on the support, the combination therewith of means connecting the baling plunger and the feeding device for causing reciprocation of the baling plunger to bring about a quick movement of the feeding device into and out of the baling chamber, said connecting means comprising a first member movably connected to the support, a second member connected to the support, the baling plunger, and the feeding device, and means associated with the members for causing movement of the first member with respect to the support to effect movement of the second member with respect to the first member.

2. In a baling apparatus comprising a support, means forming a baling chamber having an opening in one side, means mounting the aforesaid means on the support, a baling plunger mounted for reciprocation in the baling chamber, a feeding device movable into and out of the baling chamber through the opening, means mounting the feeding device on the support, the combination therewith of means connecting the baling plunger and the feeding device for causing reciprocation of the baling plunger to bring about a quick movement of the feeding device into and out of the baling chamber, said connecting means comprising a first member pivotally connected to the support, a second member pivotally connected to the first member, means connecting the baling plunger with the second member, means connecting the feeding device with the second member, and means associated with the support and the members for causing pivotal movement of the first member with respect to the support to bring about pivotal movement of the second member with respect to the first member.

3. In a baling apparatus comprising a support, means forming a baling chamber having an opening in one side, means mounting the aforesaid means on the support, a baling plunger mounted for reciprocation in the baling chamber, a feeding device movable into and out of the baling chamber through the opening, means mounting the feeding device on the support, the combination therewith of means connecting the baling plunger and the feeding device for causing reciprocation of the baling plunger to bring about a quick movement of the feeding device into and out of the baling chamber, said connecting means comprising a first member pivotally connected to the support, a second member pivotally connected to the first member, means connecting the baling plunger with the second member, means connecting the feeding device with the second member, and means associated with the support and the members for causing pivotal movement in one direction of the first member with respect to the support to bring about pivotal movement in the same direction of the second member with respect to the first member.

4. In a baling apparatus comprising a support, means forming a baling chamber having an opening in one side, means mounting the aforesaid means on the support, a baling plunger mounted for reciprocation in the baling chamber, a feeding device movable into and out of the baling chamber through the opening, means mounting the feeding device on the support, the combination therewith of means connecting the baling plunger and the feeding device for causing reciprocation of the baling plunger to bring about a quick movement of the feeding device into and out of the baling chamber, said connecting means comprising a first member pivotally connected to the support, a second member pivotally connected at its mid-section to the first member, means connecting the baling plunger and one end of the second member, means connecting the feeding device and the other end of the second member, and means associated with the support and the members for causing pivotal movement of the first member with respect to the support to bring about pivotal movement of the second member with respect to the first member.

5. In a baling apparatus comprising a support, means forming a baling chamber having an opening in one side, means mounting the aforesaid means on the support, a baling plunger mounted for reciprocation in the baling chamber, a feeding device movable into and out of the baling chamber through the opening, means mounting the feeding device on the support, the combination therewith of means connecting the baling plunger and the feeding device for causing reciprocation of the baling plunger to bring about a quick movement of the feeding device into and out of the baling chamber, said connecting means comprising a first member pivotally connected to the support, a second member pivotally connected at its mid-section to the first member, means connecting the baling plunger and one end of the second member, means connecting the feeding device and the other end of the second member, and means associated with the support and the members for causing pivotal movement in one direction of the first member with respect to the support to bring about pivotal movement in the same direction of the second member with respect to the first member.

6. In a baling apparatus comprising a support, means forming a baling chamber having an opening in one side, means mounting the aforesaid means on the support, a baling plunger mounted for reciprocation in the baling chamber, a feeding device movable into and out of the baling chamber through the opening, means mounting the feeding device on the support, the combination therewith of means connecting the baling plunger and the feeding device for causing reciprocation of the baling plunger to bring about a quick movement of the feeding device into and out of the baling chamber, said connecting means comprising a first member pivotally connected to the support, a second member pivotally connected to the first member, means connecting the baling plunger with the second member, means connecting the feeding device with the second member, a first arcuate dentate element secured to the support with its center on the pivotal connection of the first member and the support, and a second arcuate dentate element meshing with the first element and secured to the second member with its center on the pivotal connection of the members, the elements causing pivotal movement in one direction of the first member with respect to the support to effect pivotal movement in the same direction of the second member with respect to the first member.

7. In a baling apparatus comprising a support, means forming a baling chamber having an opening in one side, means mounting the aforesaid means on the support, a baling plunger mounted for reciprocation in the baling chamber, a feeding device movable into and out of the baling chamber through the opening, means mounting the feeding device on the support, the combination therewith of means connecting the baling plunger and the feeding device for causing reciprocation of the baling plunger to bring about a quick movement of the feeding device into and out of the baling chamber, said connecting means comprising a first member pivotally connected to the support, a second member pivotally connected at its mid-section to the first member, means connecting the baling plunger and one end of the second member, means connecting the feeding device and the other end of the second member, a first arcuate dentate element secured to the support with its center on the pivotal connection of the first member and the support, and a second arcuate dentate element meshing with the first element and secured to the second member with its center on the pivotal connection of the members, the elements causing pivotal movement in one direction of the first member with respect to the support to effect pivotal movement in the same direction of the second member with respect to the first member.

8. In a baling apparatus comprising a support, means forming a baling chamber having an opening in one side, means mounting the aforesaid means on the support, a baling plunger mounted for reciprocation in the baling chamber, a pitman connected with the plunger for driving the same, a feeding device movable into and out of the baling chamber through the opening, means mounting the feeding device on the support, the combination therewith of means connecting the pitman and the feeding device for causing reciprocation of the baling plunger to bring about a quick movement of the feeding device into and out of the baling chamber, said connecting means comprising a first member pivotally connected to the support, a second member pivotally connected to the first member, means connecting the pitman with the second member, means connecting the feeding device with the second member, and means associated with the support and the members for causing pivotal movement of the first member with respect to the support to bring about pivotal movement of the second member with respect to the first member.

9. In a baling apparatus comprising a support, means forming a baling chamber having an opening in one side, means mounting the aforesaid means on the support, a baling plunger mounted for reciprocation in the baling chamber, a pitman connected with the plunger for driving the same, a feeding device movable into and out of the baling chamber through the opening, means mounting the feeding device on the support, the combination therewith of means connecting the pitman and the feeding device for causing reciprocation of the baling plunger to bring about a quick movement of the feeding device into and out of the baling chamber, said connecting means comprising a first member pivotally connected to the support, a second member pivotally connected at its mid-section to the first member, means connecting the pitman and one end of the second member, means connecting the feeding device and the other end of the second member, and means associated with the support and the members for causing pivotal movement in one direction of the first member with respect to the support to bring about pivotal movement in the same direction of the second member with respect to the first member.

10. In a baling apparatus comprising a support, means forming a baling chamber having an opening in one side, means mounting the aforesaid means on the support, a baling plunger mounted for reciprocation in the baling chamber, a pitman connected with the plunger for driving the same, a feeding device movable into and out of the baling chamber through the opening, means mounting the feeding device on the support, the combination therewith of means connecting the pitman and the feeding device for causing reciprocation of the baling plunger to bring about a quick movement of the feeding device into and out of the baling chamber, said connecting means comprising a first member pivotally connected to the support, a second member pivotally connected to the first member, means connecting the pitman with the second member, means connecting the feeding device with the second member, a first arcuate dentate element secured to the support with its center on the pivotal connection of the first member and the support, and a second arcuate dentate element meshing with the first element and secured to the second member with its center on the pivotal connection of the members, the elements causing pivotal movement in one direction of the first member with respect to the support to effect pivotal movement in the same direction of the second member with respect to the first member.

11. In a baling apparatus comprising a support, means forming a baling chamber having an opening in one side, means mounting the aforesaid means on the support, a baling plunger mounted for reciprocation in the baling chamber, a pitman connected to the baling plunger for driving the same, a feeding device movable into and out of the baling chamber through the opening therein, parallel links movably mounting the feeding device on the support, the combination therewith of means connecting the baling plunger and the feeding device for causing the reciprocation of the baling plunger to effect a quick movement of the feeding device into and out of the baling chamber, said connecting means comprising a first member pivotally connected to the support, a second member pivotally connected at its mid-section to the first member, means connecting the end of the second member to the baling plunger, means connecting the other end of the second member to one of the parallel links, and means associated with the support and the members for causing pivotal movement in one direction of the first member with respect to the support to effect a pivotal movement in the same direction of the second member with respect to the first member.

12. In a baling apparatus comprising a support, means forming a baling chamber having an opening in one side, means mounting the aforesaid means on the support, a baling plunger mounted for reciprocation in the baling chamber, a pitman connected to the baling plunger for driving the same, a feeding device movable into and out of the baling chamber through the opening therein, parallel links movably mounting the feeding device on the support, the combination therewith of means connecting the baling plunger and the feeding device for causing the reciprocation of the baling plunger to effect a quick movement of the feeding device into and out of the baling chamber, said connecting means comprising a first member pivotally connected to the support, a second member pivotally connected at its mid-section to the first member, means connecting one end of the second member to the baling plunger, means connecting the other end of the second member to one of the parallel links, a first arcuate dentate element secured to the support with its center on the pivotal connection of the first member with the support, and a second arcuate dentate element meshing with the first element and secured to the second member with its center on the pivotal connection of the members with one another, the meshing of the elements causing pivotal movement in one direction of the first member with respect to the support to effect pivotal movement in the same direction of the second member with respect to the second member.

CHARLES F. CRUMB.